No. 748,297. PATENTED DEC. 29, 1903.
W. H. MITCHELL.
WEIGHING ATTACHMENT FOR REFRIGERATORS.
APPLICATION FILED SEPT. 14, 1903.
NO MODEL.
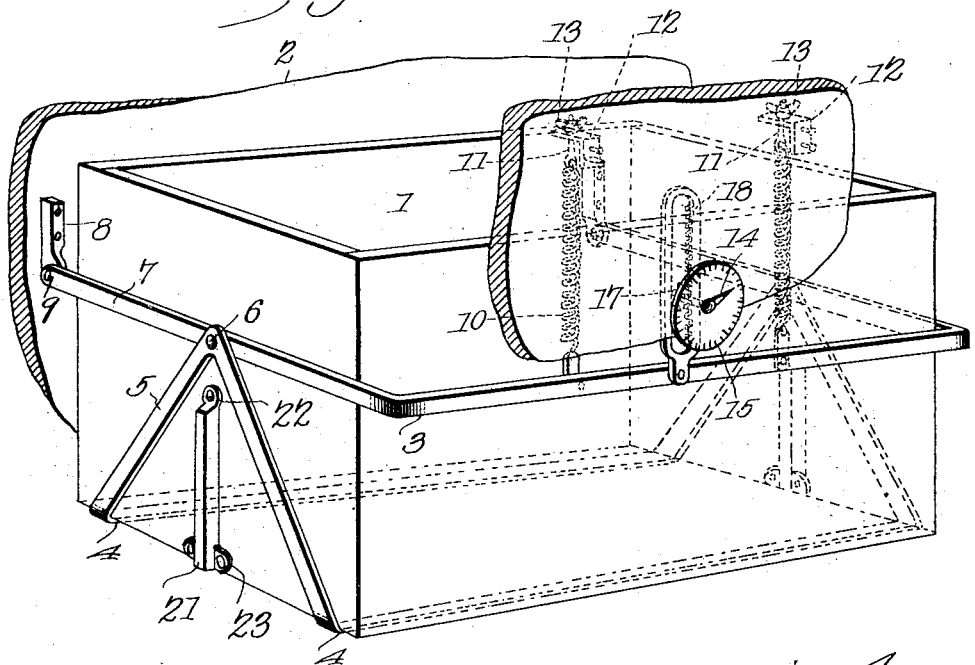
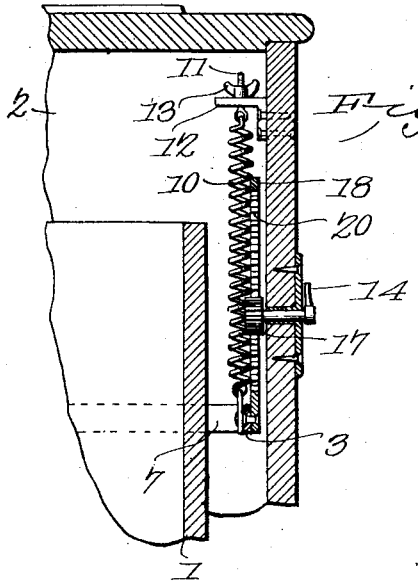
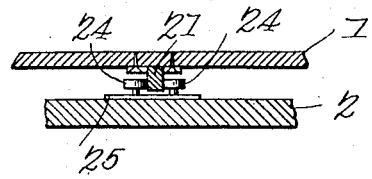
W. H. Mitchell,
Inventor.

No. 748,297. Patented December 29, 1903.

UNITED STATES PATENT OFFICE.

WILLIAM H. MITCHELL, OF BOSTON, MASSACHUSETTS, ASSIGNOR OF TWO-THIRDS TO ASA H. FIELD AND SAMUEL B. FIELD, OF BOSTON, MASSACHUSETTS.

WEIGHING ATTACHMENT FOR REFRIGERATORS.

SPECIFICATION forming part of Letters Patent No. 748,297, dated December 29, 1903.

Application filed September 14, 1903. Serial No. 173,146. (No model.)

*To all whom it may concern:*

Be it known that I, WILLIAM H. MITCHELL, a citizen of the United States, residing at Boston, in the county of Suffolk and State of Massachusetts, have invented a new and useful Weighing Attachment for Refrigerators, of which the following is a specification.

The invention relates to a weighing attachment for refrigerators.

The object of the present invention is to improve the construction of weighing attachments for refrigerators and to provide a simple, inexpensive, and efficient device of great strength and durability adapted to be readily applied to a refrigerator and capable of accurately indicating the weight of the ice within the ice-receptacle.

The invention consists in the construction and novel combination and arrangement of parts hereinafter fully described, illustrated in the accompanying drawings, and pointed out in the claims hereto appended.

In the drawings, Figure 1 is a perspective view of a portion of a refrigerator provided with a weighing attachment constructed in accordance with this invention. Fig. 2 is a vertical sectional view of the same, illustrating the arrangement of the rack-bar and pinion and the springs. Fig. 3 is a detail view of the dial and indicator, showing the arrangement of the same with relation to the rack-bar and pinion. Fig. 4 is a detail horizontal sectional view illustrating the manner of guiding the ice-receptacle.

Like numerals of reference designate corresponding parts in all the figures of the drawings.

1 designates an ice-receptacle designed to be arranged within a refrigerator 2 at the upper portion thereof and supported by a frame or hanger 3, composed of parallel horizontal bottom bars 4 and upwardly-converging end bars 5, connected at their upper ends, as clearly shown in Fig. 1, and pivoted by a suitable fastening device 6 to a lever 7. The lever 7, which is approximately rectangular, is composed of parallel side portions and a connecting front portion, the side portions being fulcrumed at their rear ends on the back of the refrigerator-casing by means of suitable brackets or plates 8, which are perforated for the reception of pivots 9. The ice-receptacle is suspended from the side portions of the lever, and the latter is supported by a pair of coiled springs 10, arranged at the front of the refrigerator between the front wall and the ice-receptacle and connected at their lower ends with the front portion of the lever and at their upper ends with adjusting-screws 11. The adjusting-screws 11 are mounted in openings of L-shaped plates or brackets 12 and are engaged by winged nuts 13, which are adapted to be adjusted to correct any inaccuracy of the weighing mechanism and to cause a pointer or indicator 14 to stand at zero or the starting-point of the graduations of the dial 15 when the ice-receptacle is emptied. The L-shaped plates or brackets, which are secured to the inner face of the front of the refrigerator-casing, have horizontal arms, which are perforated for the reception of the adjusting-screws 11.

The dial 15 is secured to the exterior of the refrigerator-casing, and the hand or pointer 14 is mounted on a shaft 16, carrying a pinion 17, which is arranged at the inner end of the shaft and which meshes with a vertical rack-bar 18. The rack-bar 18, which is secured at its lower end to the front of the lever, is provided with a longitudinal opening 19 to receive the pinion, and it has teeth 20 at one side of the opening to mesh with the said pinion, whereby the shaft will be rotated to move the hand or indicator over the dial when the ice-receptacle moves upward and downward.

In order to maintain the ice-receptacle in an upright position, it is provided at each end with a vertical guide 21, consisting of a bar provided with ears 22 and 23 and arranged between a pair of guide-rollers 24. The ears 22 and 23 are perforated for the reception of screws or other suitable fastening devices for securing the guide-bar to the ice-receptacle, and the guide-rollers, which are located at opposite sides of the vertical guide, are mounted on the refrigerator, preferably by means of a plate 25, which is provided with suitable pivots or spindles for the antifriction-rollers.

The guides will prevent the ice-receptacle from tipping and interfering with the accuracy of the weighing mechanism, and at the same time they will enable the ice-receptacle to move freely during the weighing operation.

It will be seen that the weighing attachment is exceedingly simple and inexpensive in construction, that it is strong, durable, and adapted to be readily applied to a refrigerator, and that it is capable of accurately weighing the amount of ice placed in the ice-receptacle.

It is to be understood that I do not limit myself to the precise details herein set forth, inasmuch as minor changes may be made therein without departing from the spirit of my invention. For example, I have herein shown and described the device as applied to refrigerators; but it is equally applicable for coal-boxes, coal-lifts in mines, bins in stores, and other like purposes, and such slight changes as may be necessary for adapting it to these purposes will fall within the scope of my invention.

Having thus described my invention, what I claim is—

1. In a device of the class described, the combination with a refrigerator having an ice-receptacle, of a lever fulcrumed in the refrigerator, a frame composed of bottom bars receiving the ice-receptacle, and end bars connected with the lever, guides mounted on the ice-receptacle and arranged between the end bars of the frame, and antifriction devices mounted on the refrigerator at opposite sides of the vertical guides, substantially as described.

2. In a device of the class described, the combination with a refrigerator having an ice-receptacle, of a lever fulcrumed in the refrigerator and composed of sides, and a connecting front portion, a frame consisting of horizontal bottom bars receiving the ice-receptacle, and converging end bars extending upward from the bottom bars and pivotally connected at their upper ends to the sides of the lever, and means connected with the lever for resisting the downward movement thereof and for indicating the weight of the ice in the receptacle, substantially as described.

3. In a device of the class described, the combination with a refrigerator having an ice-receptacle, of a lever provided with sides fulcrumed in the refrigerator, a frame suspended from the sides of the lever and receiving the ice-receptacle, springs supporting the lever, a rack-bar connected with the lever and having an opening and provided at one side thereof with teeth, a shaft journaled on the refrigerator and provided at its outer end with a pointer and having a pinion at its inner end meshing with the rack-bar, and a dial, substantially as described.

In testimony that I claim the foregoing as my own I have hereto affixed my signature in the presence of two witnesses.

WILLIAM H. MITCHELL.

Witnesses:
C. E. DENNISON,
JAMES F. PHELPS.